(12) United States Patent
Justice et al.

(10) Patent No.: US 9,227,484 B1
(45) Date of Patent: Jan. 5, 2016

(54) UNATTENDED VEHICLE PASSENGER DETECTION SYSTEM

(71) Applicants: Wayne P. Justice, Niceville, FL (US); Kit David Kuss, Niceville, FL (US); Mark Duane Denney, Niceville, FL (US)

(72) Inventors: Wayne P. Justice, Niceville, FL (US); Kit David Kuss, Niceville, FL (US); Mark Duane Denney, Niceville, FL (US)

( * ) Notice: Subject to any disclaimer, the term of this patent is extended or adjusted under 35 U.S.C. 154(b) by 152 days.

(21) Appl. No.: 14/220,691

(22) Filed: Mar. 20, 2014

(51) Int. Cl.
*B60N 2/00* (2006.01)
*B60H 1/00* (2006.01)

(52) U.S. Cl.
CPC ............ *B60H 1/00792* (2013.01); *B60N 2/002* (2013.01)

(58) Field of Classification Search
CPC ... B60H 1/007892; B60N 2/002; G08B 19/00
USPC ...................................... 340/449, 457.1, 459
See application file for complete search history.

(56) References Cited

U.S. PATENT DOCUMENTS

| | | | |
|---|---|---|---|
| 5,793,284 A | 8/1998 | Teague | |
| 5,793,291 A | 8/1998 | Thornton | |
| 5,966,070 A | 10/1999 | Thornton | |
| 6,104,293 A | 8/2000 | Rossi | |
| 6,639,512 B1 | 10/2003 | Lee et al. | |
| 6,753,780 B2 | 6/2004 | Li | |
| 6,812,844 B1 | 11/2004 | Burgess | |
| 6,819,249 B1 | 11/2004 | Papp | |
| 6,870,472 B2 | 3/2005 | Gift et al. | |
| 6,922,147 B1 | 7/2005 | Viksnins et al. | |
| 6,922,154 B2 | 7/2005 | Kraljic et al. | |
| 6,922,622 B2 | 7/2005 | Dulin et al. | |
| 6,924,742 B2 | 8/2005 | Mesina | |
| 6,930,614 B2 | 8/2005 | Rackham et al. | |
| 6,940,400 B2 | 9/2005 | Pelletier | |
| 6,998,988 B1 | 2/2006 | Kalce | |
| 7,012,533 B2 | 3/2006 | Younse | |
| 7,079,016 B2 | 7/2006 | Ho et al. | |
| 7,081,811 B2 | 7/2006 | Johnston et al. | |
| 7,109,853 B1 | 9/2006 | Mattson et al. | |
| 7,123,157 B2 | 10/2006 | Best | |
| 7,218,218 B1 | 5/2007 | Rogers | |
| 7,339,463 B2 | 3/2008 | Donaldson | |
| 7,348,880 B2 | 3/2008 | Hules et al. | |
| 7,378,979 B2 | 5/2008 | Rams, Jr. | |
| 7,394,349 B2 | 7/2008 | Marek et al. | |
| 7,701,358 B1 | 4/2010 | White et al. | |
| 7,710,277 B2 | 5/2010 | Wilson | |
| 7,714,737 B1 | 5/2010 | Morningstar | |
| 7,733,228 B2 | 6/2010 | Lee et al. | |
| 7,830,270 B1 | 11/2010 | Philbert | |
| 8,038,213 B2 | 10/2011 | Ownes | |
| 8,058,983 B1 | 11/2011 | Davisson et al. | |

(Continued)

*Primary Examiner* — Albert Wong
(74) *Attorney, Agent, or Firm* — Peter Loffler (57) ABSTRACT

A system detects the presence of a living being within a vehicle and triggers an alarm should the temperature rise above or fall below a predetermined threshold limit. The system uses a carbon dioxide monitor to determine for the living being's presence, which is backed up by one or more subsystems that include a motion sensor that senses motion, a sound sensor that senses sounds, especially those made by distressed living beings, and a camera that uses facial recognition software to detect a face within the vehicle. The alarm can be staged so that a lower level of alarm is triggered when the hazardous temperature is approaching, but has not yet reached critical levels, and one of the subsystems has detected a living being within the vehicle, but the others have not yet activated, and a higher level alarm once critical temperatures have been reached.

40 Claims, 4 Drawing Sheets

(56) References Cited

U.S. PATENT DOCUMENTS

| | | |
|---|---|---|
| 8,063,788 B1 | 11/2011 | Morningstar |
| 8,125,343 B2 | 2/2012 | Denale |
| 8,190,331 B2 | 5/2012 | Browne et al. |
| 8,212,665 B2 | 7/2012 | Schoenberg et al. |
| 8,217,796 B2 | 7/2012 | Trummer |
| 8,232,874 B1 | 7/2012 | Aneiros et al. |
| 8,258,932 B2 | 9/2012 | Wahlstrom |
| 8,477,024 B2 | 7/2013 | Schoenberg et al. |
| 2007/0268119 A1 | 11/2007 | Cram et al. |
| 2008/0316043 A1 | 12/2008 | Gomes |
| 2009/0079557 A1 | 3/2009 | Miner |
| 2009/0212955 A1 | 8/2009 | Schoenberg et al. |
| 2011/0080288 A1 | 4/2011 | Younse |
| 2011/0109450 A1 | 5/2011 | Hirschfeld et al. |
| 2013/0194089 A1* | 8/2013 | Estrada ............... G08B 21/22 340/457.1 |

* cited by examiner

UNATTENDED VEHICLE PASSENGER DETECTION SYSTEM

BACKGROUND OF THE INVENTION

1. Field of the Invention

The present invention relates to a system whereby an unattended vehicle passenger, such as an infant or a toddler or even a pet, is detected prior to harm befalling the passenger from temperature extremes.

2. Background of the Prior Art

As hard as it is for many to fathom, the number of small children left unattended in vehicles is quite alarming. While most such incidents of leaving a small child or even a pet unattended, terminate without any undue harm, on some occasions, the passenger can suffer serious injury or death, typically from hyperthermia, but also from hypothermia for wintertime unattandance.

When a body's core temperature reaches about 104 degrees Fahrenheit, heat stroke sets in as the body's thermoregulatory system starts to become overwhelmed. Once the body's core temperature reaches about 107 degrees Fahrenheit, death occurs as cells are severely damaged and organs fail. On a sunny day, the interior temperature of a vehicle can rise 30 degrees or more above the ambient temperature in about 20 minutes, with cracking of the window having almost no effect on the temperature rate of increase. A body, especially a young body of an infant or toddler, can quickly succumb to the heat effects within the interior of an unattended car.

Leaving a passenger unattended typically happens in one of three ways. Sometimes, a parent or guardian intends to make a quick stop, such as the grocery store, and wants to run in, get a few items and return to the vehicle. The parent or guardian may not want to go through the trouble of unbuckling the child from his or her car seat and thereafter buckle the child back up; or the parent or guardian may not want to disturb a sleeping child. In either case, the adult either gets distracted from the original task and spends more time away from the vehicle, or simply does not appreciate how quickly the temperature can rise (or fall) in the unattended vehicle.

The second type of situation involves the parent or guardian who simply forgets that they are transporting a child in the vehicle and leaves the child in the vehicle unattended, often for hours. This latter situation is responsible for the majority of child deaths from being left unattended.

A third type of situation involving children who have died from heat stroke in a vehicle is when a child gains access to an unattended vehicle and is thereafter unable to extricate himself or herself from the vehicle.

While leaving a child unattended in a vehicle for any amount of time is unthinkable to most rational people, such neglect does happen, resulting in dozens of child deaths each year, and countless pet deaths as well. In all cases, the death of the child is both tragic and avoidable.

In order to address this problem, systems have been developed that deal with an unattended passenger within a vehicle. Such systems, which range from the very simple to the very complex, come in a multitude of architectures relying on various methods for passenger detection and work with varying degrees of success. However, prior art systems suffer from certain drawbacks.

Some systems are exceedingly complex in design and/or installation, often requiring a factory trained professional to install the device and integrate the device into the vehicle's computer system. Not only are such systems cost-prohibitive, many automotive manufacturers are reluctant to assist in such device installations. Other devices simply have too many false detections. While rescuing a child from a hot unattended vehicle is desirable, improperly rolling down the windows and possibly even starting the vehicle due to a false detection may not prove acceptable to a vehicle owner, especially if an opportunistic thief happens upon the vehicle prior to the owner or law enforcement arriving on scene.

What is needed is a system that is able to detect the presence of an unattended passenger within a vehicle while addressing the above mentioned shortcomings found in the art. Such a system must be able to detect the presence of an unattended passenger within a vehicle, wherein the temperature of the interior of the vehicle is approaching or has exceeded a threshold temperature (either too hot or too cold) and issues an appropriate alarm, while substantially decreasing the possibility of false detections which lead to inappropriate alarms. The system must be operable as a standalone system, yet should be able to integrate with certain subsystems of the vehicle without the need to hardwire the system to the vehicle's computer.

SUMMARY OF THE INVENTION

The unattended vehicle passenger detection system of the present invention senses for the presence of an unattended passenger, including a child or a pet, and sounds an appropriate alarm if the interior temperature of the vehicle has crossed a predetermined threshold level (either too hot or too cold), so that corrective action can be taken to prevent harm to the unattended passenger. The unattended vehicle passenger detection system uses multiple passenger sensing subsystems that can be used independently, or in combination, so that if the interior temperature has exceeded the threshold, and one of the subsystems senses a passenger within the vehicle, then the unattended vehicle passenger detection system can use another of the subsystems to verify passenger presence prior to initiating an appropriate alarm thereby reducing false alarms. However, since child (or pet) safety and rescue are paramount, the system will activate if only one of the sensors detects the presence of the child (or pet) and the temperature has exceeded the predetermined thresholds. While the unattended vehicle passenger detection system can also be wired into a vehicle's computer, it can be used as a standalone unit, mimicking the FOB signals emitted by the vehicle's FOB. Such FOB's are common on many vehicles, including entry level vehicles.

The unattended vehicle passenger detection system of the present invention is comprised a control unit that is mounted within a vehicle. A temperature sensor that senses temperatures is mounted within an interior passenger compartment of the vehicle, the temperature sensor communicatively coupled (either wired or wirelessly) to the control unit. A carbon dioxide sensor that senses carbon dioxide levels is mounted within the interior compartment of the vehicle, the carbon dioxide sensor communicatively coupled (either wired or wirelessly) to the control unit. An alarm system is communicatively coupled (either wired or wirelessly) to the control unit such that the alarm system is capable of issuing a first alarm command in order to activate a first alarm event. The temperature sensor senses the temperature within interior compartment and if the temperature crosses a first predetermined threshold temperature which is outside a safe temperature range, then the carbon dioxide senses the carbon dioxide level within the interior compartment of the vehicle and this carbon dioxide level is stored by the control unit as a baseline carbon dioxide level, and thereafter the carbon dioxide sensor senses at least one subsequent carbon dioxide level within the interior compartment of the vehicle and the control unit compares each of the at least one subsequent carbon dioxide levels against the baseline carbon dioxide levels in order to obtain a differential, and if the differential is positive and exceeds a predetermined amount, the control unit commands the alarm system to issue the first alarm command. The unattended vehicle passenger detection system may also have a camera with facial recognition capability, the camera being mounted within the interior compartment of the vehicle and communicatively coupled (either wired or wirelessly) to the control unit. The as unattended vehicle passenger detection system may also have a sound sensor that is capable of sensing a sound, the sound sensor being mounted within the interior compartment of the vehicle and communicatively coupled to the control unit. The unattended vehicle passenger detection system may also have a motion detector capable of sensing motion, the motion detector being mounted within the interior compartment of the vehicle and communicatively coupled to the control unit. Instead of issuing the first alarm command when the carbon dioxide detector detects elevated carbon dioxide levels within the vehicle, the unattended vehicle passenger detection system may wait for a confirmation from a second fault event prior to issuing the first alarm command, which second fault event includes the camera detecting a face within the interior compartment of the vehicle via its facial recognition capability, or the sound sensor detecting a sound within the interior compartment of the vehicle and the control unit determines that the sound detected is either a human cry or a dog bark or a cat meow, or the motion detector detecting a motion within the interior compartment of the vehicle. So that if upon the first threshold temperature being crossed within the interior compartment of the vehicle and the carbon dioxide detector detecting an increased carbon dioxide level within the interior compartment of the vehicle and at least one second fault event occurring, then the alarm system issues the first alarm command. As a further alternative, if upon the first threshold temperature being crossed within the interior compartment of the vehicle and the carbon dioxide detector not detecting an increased carbon dioxide level within the interior compartment of the vehicle yet at least one second fault event occurring, then the alarm system issues the first alarm command. The motion detector may be integrated within the camera or may be a standalone motion detector such as a passive infrared detector. The first alarm event may comprise an alarm speaker activation or may comprise a vehicle signal issued to the vehicle, which vehicle signal activates a light of the vehicle or activates an alarm of the vehicle or activates a horn of the vehicle (or some combination thereof) or may comprise a vehicle signal issued to the vehicle, which vehicle signal activates a window motor of the vehicle (rolls windows down) or activates an engine of the vehicle and also activates an HVAC system of the vehicle (turns air conditioning on if the temperature threshold exceeded is too high (vehicle too hot) or activates the heater if the temperature threshold is too low (vehicle too cold)) or may comprise a cellular telephone system message (telephone call with pre-recorded message or a text message, possibly with photographs or video from the camera, etc., and possibly with a GPS coordinate associated with the vehicle and provided by the control unit via a GPS chip onboard thereof) issued to at least one predetermined remote cellular telephone system recipient or some combination thereof. Optionally, after the first alarm command is issued, the temperature sensor continues to sense the temperature within interior compartment and if the temperature crosses a second predetermined threshold temperature which is outside the safe temperature range and the first predetermined threshold temperature is between the safe temperature range and the second threshold temperature, the control unit commands the alarm system to issue a second command in order to activate the second alarm, the second alarm triggering at least one second alarm event. In this situation, the first alarm event may comprise an alarm speaker activation or may comprise a vehicle signal issued to the vehicle, which vehicle signal activates a light of the vehicle or activates an alarm of the vehicle or activates a horn of the vehicle or may comprise a vehicle signal issued to the vehicle, which vehicle signal activates a window motor of the vehicle or activates an engine of the vehicle and activates an HVAC system of the vehicle or may comprise a cellular telephone system message (possibly with a GPS coordinate associated with the vehicle and provided by the control unit via a GPS chip onboard thereof) issued to at least one predetermined remote cellular telephone system recipient other than an emergency center (such as a 9-1-1 center or a dedicated emergency operations center for users of the present invention) or some combination thereof and the second alarm event can comprise any of the listed first alarm events that are not triggered by the first alarm command as well as a cellular telephone message, also with GPS coordinates, to an emergency center.

BRIEF DESCRIPTION OF THE DRAWINGS

Similar reference numerals refer to similar parts throughout the several views of the drawings.

DESCRIPTION OF THE PREFERRED EMBODIMENT

Referring now to the drawings, it is seen that the unattended vehicle passenger detection system of the present invention, generally denoted by reference numeral 10, is comprised of a series of monitoring subsystems including a temperature (primary) sensor 12, a $CO_2$ (carbon dioxide) sensor 14, a sound sensor 16, one or more motion sensors 18, such as a short range passive infrared sensor 18, and a day/night camera 20. Other support subsystems include a control system 22, data recorders 24, cellular phone hardware 26, a GPS chip 28 for reporting vehicle V location and an alarm control system 30 that triggers an appropriate alarm based on the situation.

Figure 1:
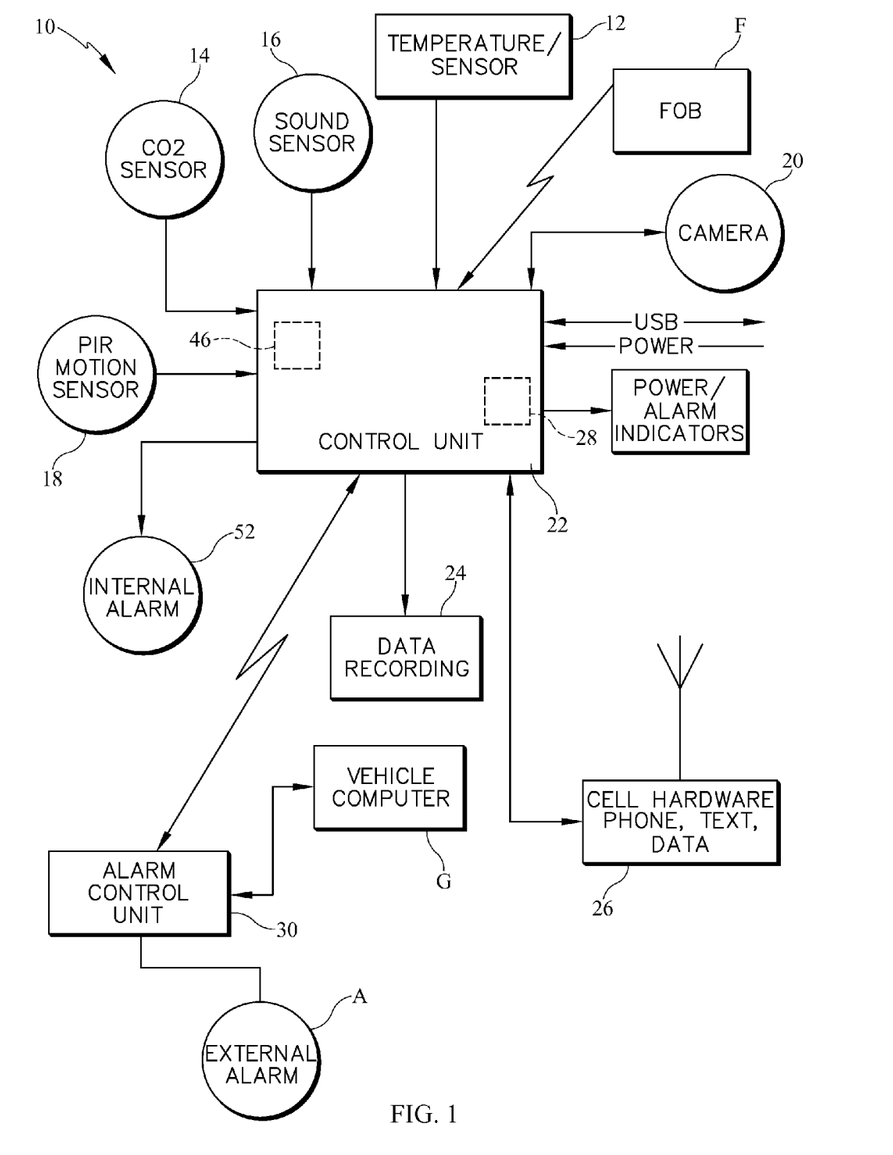
FIG. 1 is a schematic diagram of the unattended vehicle passenger detection system of the present invention.

The temperature sensor 12 monitors the temperature and possibly the humidity within the vehicle V and provides that data to the control system 22.

The $CO_2$ sensor 14 measures the $CO_2$ levels within the vehicle V. These $CO_2$ levels are relayed to the control system 22. Should a temperature fault occur (the temperature sensed by the temperature sensor 12 has crossed a predetermined threshold,) the control system 22 stores the current $CO_2$ level as a baseline $CO_2$ level. Thereafter, the CO2 sensor 14 continues to monitor the $CO_2$ level within the vehicle V and the control system 22 compares that data to the baseline $CO_2$ level.

The sound sensor 16 senses sounds within the vehicle V and the control system receives the sounds sensed and filters the sounds for specific sound wave patterns, such as a baby crying, a dog barking, or a cat meowing.

The motion sensor 18 senses for the presence of motion at a relatively short range so that motion outside of the vehicle V is not detected by the motion sensor 18.

The camera 20 captures images, either still or video, or both, within the vehicle V and can also function as a motion sensor, in lieu of or in addition to the motion sensor 18. Software associated with the camera 20 has facial recognition capabilities, as are well known in the art, enabling the camera 20 to determine whether a face is being detected within the camera's field of view. The field of view of the camera 20 is relatively small so that images outside of the vehicle V are not processed by the facial recognition software.

Figure 2:
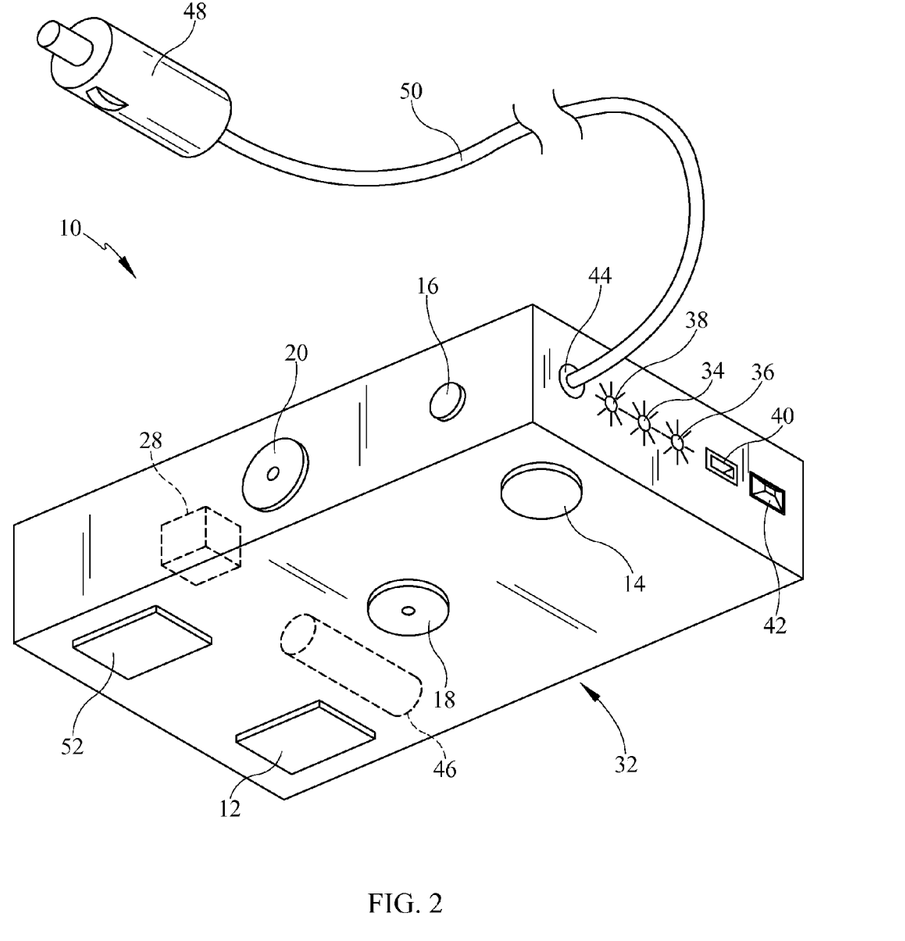
FIG. 2 is a perspective view of the control unit of the unattended vehicle passenger detection system.
Figure 3:
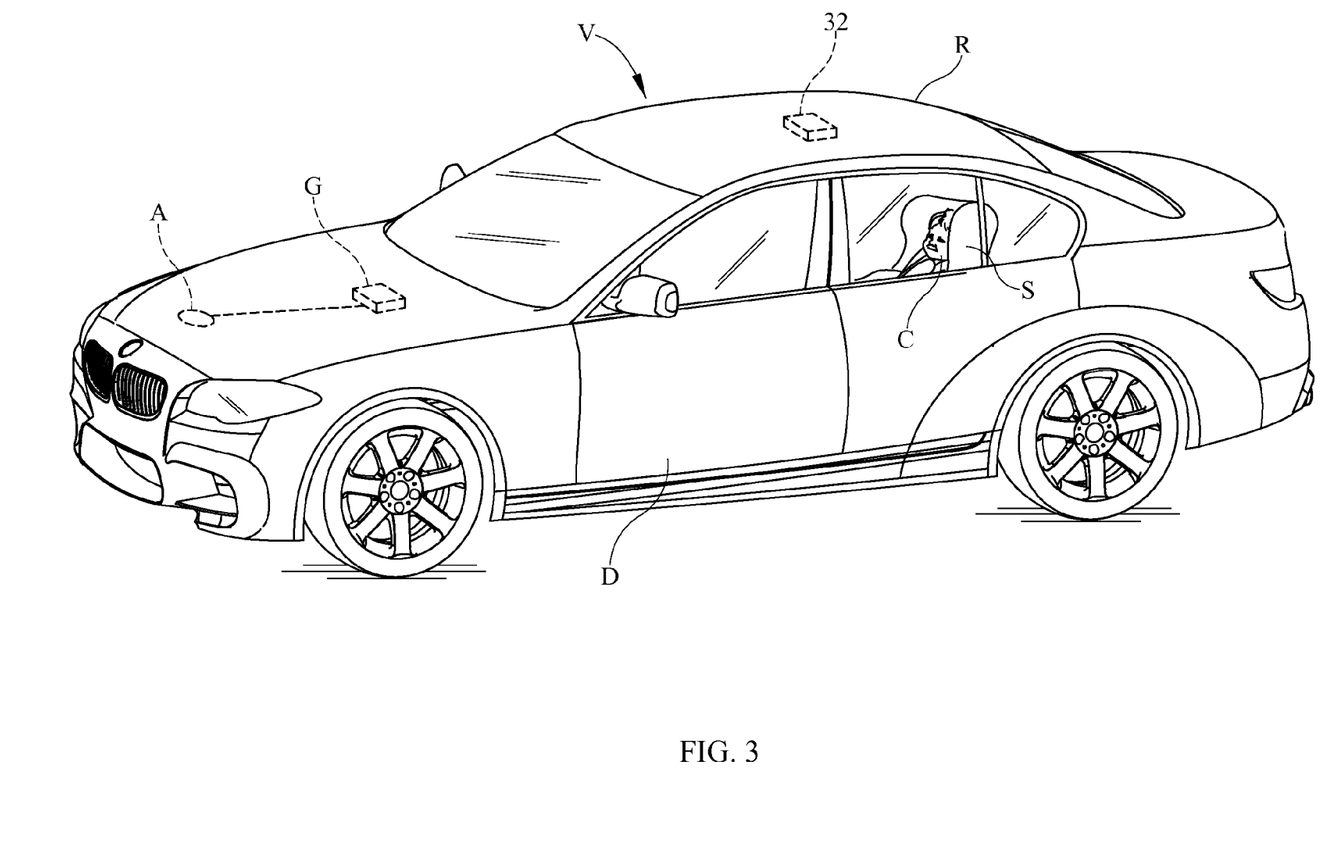
FIG. 3 is an environmental view of the unattended vehicle passenger detection system mounted within a vehicle.

As seen, the various subsystems are held within a housing 32 that is mounted to the inside surface of the roof R of a vehicle V in appropriate fashion, such that the camera 20 and the motion sensor 18 have a field of view of the seat S or seats S where children C could be seated within the vehicle V. As seen, the housing 32 has other various components, such as a battery indicator 34, an alarm indicator 36, a power indicator 38, a USB or similar port 40 for downloading data from the unattended vehicle passenger detection system 10 and uploading data, such as a call list as more fully explained below and software updates, etc., a reset button 42, and a DC power connector 44.

Electrical power can be provided to the unattended vehicle passenger detection system 10 internally by having a rechargeable battery 46 held within the housing 32 and electrically connected to the various components in the usual way. The rechargeable battery 46 is connected to the vehicle's electrical system by using a plug 48 that is plugged into a 12 volt DC receptacle in the normal fashion with a cord 50 connecting the plug 48 to the unattended vehicle passenger detection system's DC power connector 44. Of course the cord 50 can be hidden within the vehicle V so as to not be unsightly and certainly so as not to hang down or otherwise become an obstacle to passengers within the vehicle V.

Alternately, the rechargeable battery 46 can be hardwire connected into the vehicle's electrical system via appropriate wiring (not illustrated). Advantageously, such hard wiring is to a constant on source of power, so that the unattended vehicle passenger detection system 10 receives 12 volt DC power regardless of whether the vehicle V is on or off. This may negate the need for an internal rechargeable battery, however, the presence of the rechargeable battery 46 in such an architecture acts as a backup power source should a problem arise within the vehicle's electrical system such as a blown fuse between the vehicle's electrical system and the unattended vehicle passenger detection system 10. The unattended vehicle passenger detection system 10 has constant power because such power is needed in order to save a child C who enters the vehicle V that is turned off. The power consumption decreases to minimal levels when the vehicle V is turned off so as not to significantly drain the vehicle's battery.

In operation, the unattended vehicle passenger detection system 10 becomes armed whenever the unattended vehicle passenger detection system 10 determines that the vehicle V is turned from an on position to an off position. This determination can occur in one of many ways. If the battery 46 is connected to a 12 volt DC receptacle or if the battery 46 is hardwired to the vehicle's electrical system that receives electrical power only when the vehicle V is on, the control system 22 detects the loss of electrical power from the vehicle V and arms the unattended vehicle passenger detection system 10, preferably after a short delay in order to give time for passengers of the vehicle V to exit the vehicle V. The unattended vehicle passenger detection system 10 can issue a chirp alarm through its alarm speaker 52 after a few seconds to serve as an initial warning to remind the driver and passengers of the unattended vehicle passenger detection system's presence so that the driver can see to the welfare of any children C (or pets) within the vehicle V. Should the unattended vehicle passenger detection system 10 begin to chirp or alarm while the driver or other responsible person is still in the vehicle V after the ignition is turned off, the individual can hit the reset button 42. Hitting the reset button 42 delays the arming of the unattended vehicle passenger detection system 10 for a predetermined time. Once this time is expired, the unattended vehicle passenger detection system 10 becomes re-armed. Alternately, the unattended vehicle passenger detection system 10 can be programmed to read the wireless signals issued by the vehicle's FOB F so that when a door lock signal is issued by the FOB F, indicating that the driver has exited the vehicle V and has locked the doors D of the vehicle V, the unattended vehicle passenger detection system 10 becomes armed, becoming unarmed whenever a door unlock signal from the FOB F is received. Alternately, the unattended vehicle passenger detection system 10 can be hardwired to and integrated with the computer G of the vehicle V so that the computer G issues the vehicle V is off signal to the control system 22 of the unattended vehicle passenger detection system 10.

When the unattended vehicle passenger detection system 10 becomes armed, the $CO_2$ sensor filters the $CO_2$ levels within the vehicle V and the unattended vehicle passenger detection system 10 otherwise remains idle until a temperature fault occurs, indicating that the temperature within the vehicle V is either too high or too low to be safe should a child C (or pet) be present in the vehicle V, as detected by the temperature sensor 12. When a temperature fault occurs, the $CO_2$ sensor 14 takes a reading to establish a baseline $CO_2$ level within the vehicle V—this occurring immediately upon unattended vehicle passenger detection system 10 arming if the system became armed via the temperature fault arming method (system turns on due to temperature fault occurring). The $CO_2$ sensor 14 continues to monitor the $CO_2$ level within the vehicle V with the control system 22 comparing the continued readings of the $CO_2$ sensor 14 against the baseline reading taken when the temperature fault occurred. If the control system 22 determines that the $CO_2$ level, as read by the CO2 sensor 14, within the vehicle V is increasing over a predetermined amount of time, indicating the presence of a living being within the vehicle V, the control system 22 issues an alarm command to the alarm system 30 which issues an alarm as more fully explained below.

This is the unattended vehicle passenger detection system 10 in its most basic configuration.

As with the $CO_2$ sensor 14, each of the other sensors individually will cause the control system 22 to issue an alarm command to the alarm system 30 if a temperature fault occurs and their respective individual thresholds have been exceeded over a predetermined amount of time, as more fully explained below.

However, the unattended vehicle passenger detection system 10 can alarm (control system 22 to issue an alarm command to the alarm system 30) based on more than one sensor as a failsafe, so that if a temperature fault occurs, some combination of all the sensor subsystems can be used to determine whether a living being is present in the vehicle V prior to the control system 22 issuing the alarm command to the alarm system 30. The threshold to alarm is lower if combinations (2 or more) of the various sensor subsystems have faulted indicating the presence of a living being within the vehicle V.

The motion sensor 18 monitors its field of view to determine whether it detects motion or not and sends its results to the control system 22. Additionally, the sound sensor 16 intakes any sounds it hears and the control system 22 filters for specific sounds, namely a crying pattern, as almost all babies and toddlers will cry when subject to thermal danger, or an appropriate pet distress sound. The camera 20 is activated and its software determines whether a face is visible within the field of view of the camera 20. If a face is detected, then this information is sent to the control system 22. The camera's motion sensor capability can be used as an addition or an alternative to the motion sensor's capabilities to determine whether motion is present or not within the vehicle V. As such, if a temperature fault occurs, and the $CO_2$ levels are determined to be increasing within the vehicle V, then the control system 22 determines whether one of the other subsystems has returned a positive for living being presence within the vehicle V, either the motion sensor 18 and/or the camera 20 sensed motion within the vehicle V, or the sound system 16 detected a sound pattern consistent with a living being's presence within the vehicle V, or the camera 20 has detected a face within the vehicle V, then the control system 22 issues an alarm to the alarm system 30.

As a further failsafe, if a temperature fault occurs, and the $CO_2$ level is not determined to be rising within the vehicle V—which can occur if the vehicle's inside fan is on but not cooling the vehicle V sufficiently, or the vehicle's windows are cracked sufficiently to move enough air including the $CO_2$ issued by the living being through the vehicle V—yet if two or more of the other subsystems return positives for the presence of a living being in the vehicle V—either the motion sensor 18 and/or the camera 20 detect motion within the vehicle V and the sound detector 16 captures sound consistent with a living being present in the vehicle, or the motion sensor 18 and/or the camera 20 detect motion within the vehicle V and the camera 20 detects a face within the vehicle V, or the sound detector 16 captures sound consistent with a living being present in the vehicle V and the camera 20 detects a face within the vehicle V—then the control system 22 issues an alarm command to the alarm system 30 in order to activate the alarm.

Figure 4:
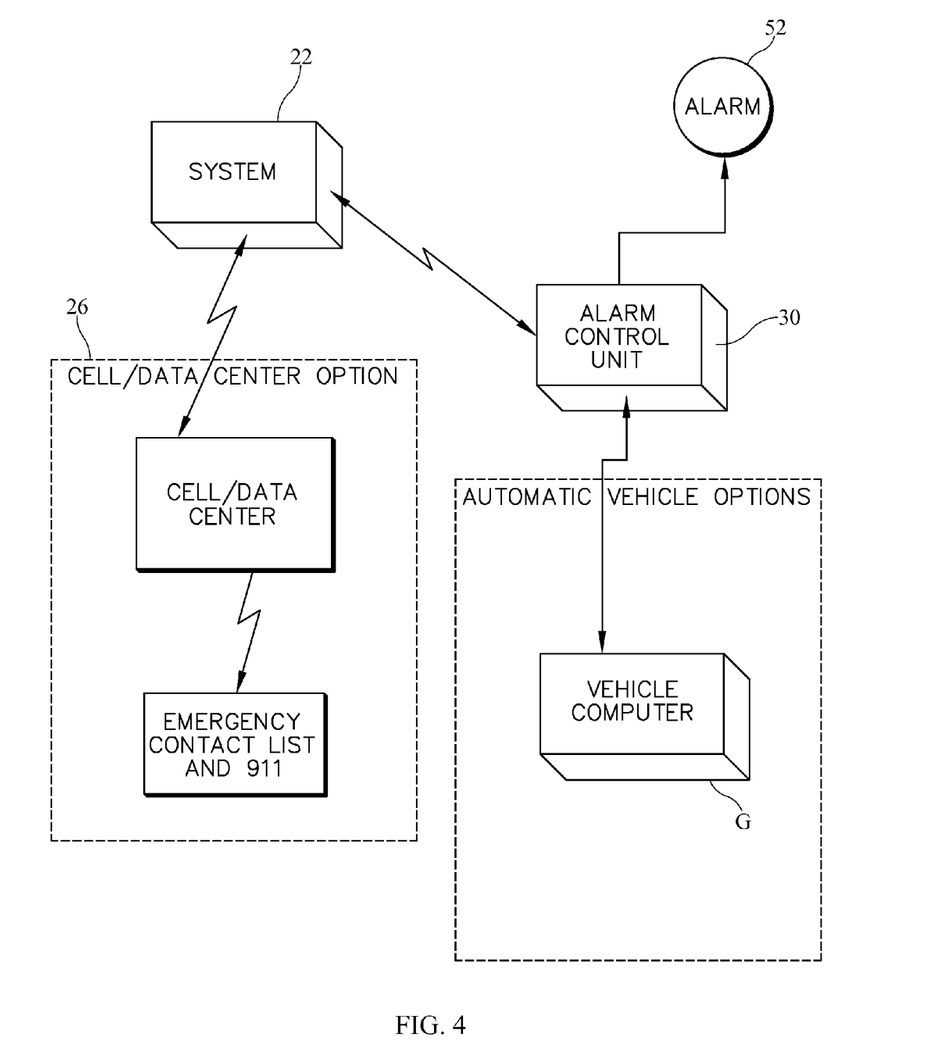
FIG. 4 is a schematic diagram of the alarm subsystem of the unattended vehicle passenger detection system.

Activation of the alarm by the alarm system 30 can take several forms depending on the configuration of the unattended vehicle passenger detection system 10. The alarm that is triggered can be as simple as an internal audible alarm 52 on the unattended vehicle passenger detection system 10 possibly with one or more flashing lights. While an 80 decibel alarm may frighten a child, especially in a closed vehicle V, the alternative is much worse. Alternately, or in addition, the alarm triggered can include use of the vehicle's alarm systems including sound the vehicle's onboard alarm A and/or honking the horn, and/or flashing the lights of the vehicle. The vehicle's alarm systems can be triggered via the FOB F method by having the unattended vehicle passenger detection system 10 mimic the FOB F and issue a panic code to the vehicle V or if the unattended vehicle passenger detection system 10 is integrated with the vehicle's computer G, by having the alarm system 30 issue such a command directly to the computer G. Additionally, if the FOB F of the vehicle V is so capable, or the unattended vehicle passenger detection system 10 is integrated with the vehicle's computer G, then the windows can be rolled down and/or the engine can be started and the HVAC system of the vehicle V can be started to either air condition the vehicle V if the temperature fault is a high temperature fault, or the heater is started if the temperature fault is a low temperature fault. Alternately, or in addition, cellular phone hardware can make a telephone call, send a text, and/or connect to a call center sending one or more photos or video clips of the interior of the vehicle V taken by the camera 20 as well as GPS coordinates. The unattended vehicle passenger detection system 10 can have the driver's and other emergency contact numbers preprogrammed into the unattended vehicle passenger detection system 10 at installation time or thereafter. With the GPS coordinates, as provided by the GPS unit 28, also being included in the cell phone call, text, or call center connection, the vehicle's V location can be determined and passed on to appropriate first responders. The list of locations to which a call is placed or a text message is sent can include 9-1-1 and/or a dedicated support center.

The alarm that is triggered can also be staged so that the unattended vehicle passenger detection system 10 can have more than one temperature fault at each extreme. For example, on a high temperature fault, a lower level fault can be set at a temperature that is elevated, yet has not hit the real danger zone yet. If the control system 22 determines that a living being is present within the vehicle V as described above, then a lower level alarm, such as simply flashing the vehicle's lights and sounding its alarm A or horn can occur, and/or a cellular call is placed or a text message sent to every number on the call list except the dedicated emergency center or 9-1-1. However, once the higher temperature fault occurs—the temperature within the vehicle V is now reaching dangerous levels—then all available alarms are activated. Similarly, if the unattended vehicle passenger detection system 10 detects a temperature fault, yet only one of the subsystems detects the presence of a living being within the vehicle V, either the $CO_2$ level is rising within the vehicle V or motion is detected within the vehicle V or a living being made sound is detected within the vehicle V, or a face is detected within the vehicle V, then a lower level alarm can be triggered by the alarm system, however, if two or more of the subsystems detect the presence of a living being within the vehicle V, the alarms are triggered.

While the invention has been particularly shown and described with reference to an embodiment thereof, it will be appreciated by those skilled in the art that various changes in form and detail may be made without departing from the spirit and scope of the invention.

We claim:

1. A detection system for detecting the presence of a living being within an interior compartment of a vehicle, the detection system comprising:
   a control unit adapted to be mounted within the vehicle;
   a temperature sensor that senses temperatures, adapted to be mounted within the interior compartment of the vehicle, the temperature sensor communicatively coupled to the control unit;
   a carbon dioxide sensor that senses carbon dioxide levels, adapted to be mounted within the interior compartment of the vehicle, the carbon dioxide sensor communicatively coupled to the control unit;
   an alarm system communicatively coupled to the control unit; and
   wherein the temperature sensor senses the temperature within interior compartment and if the temperature crosses a first predetermined threshold temperature which is outside a safe temperature range, the carbon dioxide sensor senses the carbon dioxide level within the interior compartment of the vehicle and this carbon dioxide level is stored by the control unit as a baseline carbon dioxide level, and thereafter the carbon dioxide sensor senses at least one subsequent carbon dioxide level within the interior compartment of the vehicle and the control unit compares each of the at least one subsequent carbon dioxide levels against the baseline carbon dioxide level in order to obtain a differential, and if the differential is positive and exceeds a predetermined amount, the control unit commands the alarm system to trigger at least one first alarm event.

2. The detection system as in claim 1 wherein the first alarm event comprises an alarm speaker annunciation.

3. The detection system as in claim 1 wherein the first alarm event comprises a vehicle signal issued to the vehicle, which vehicle signal activates a light of the vehicle or activates an alarm of the vehicle or activates a horn of the vehicle.

4. The detection system as in claim 1 wherein the first alarm event comprises a vehicle signal issued to the vehicle, which vehicle signal activates a window motor of the vehicle or activates an engine of the vehicle and activates an HVAC system of the vehicle.

5. The detection system as in claim 1 wherein the first alarm event comprises a cellular telephone system message issued to at least one predetermined remote cellular telephone system recipient.

6. The detection system as in claim 1 wherein after the first alarm command is issued, the temperature sensor continues to sense the temperature within interior compartment and if the temperature crosses a second predetermined threshold temperature which is outside the safe temperature range and the first predetermined threshold temperature is between the safe temperature range and the second threshold temperature, the control unit commands the alarm system to trigger at least one second alarm event.

7. The detection system as in claim 6 wherein the first alarm event comprises an alarm speaker annunciation and the second alarm event comprises a vehicle signal issued to the vehicle, which vehicle signal activates a light of the vehicle or activates an alarm of the vehicle or activates a horn of the vehicle.

8. The detection system as in claim 6 wherein the first alarm event comprises an alarm speaker annunciation and the second alarm event comprises a vehicle signal issued to the vehicle, which vehicle signal activates a window motor of the vehicle or activates an engine of the vehicle and activates an HVAC system of the vehicle.

9. The detection system as in claim 6 wherein the first alarm event comprises a first vehicle signal issued to the vehicle, which first vehicle signal activates a light of the vehicle or activates an alarm of the vehicle or activates a horn of the vehicle and the second alarm event comprises a second vehicle signal issued to the vehicle, which second vehicle signal activates a window motor of the vehicle or activates an engine of the vehicle and activates an HVAC system of the vehicle.

10. The detection system as in claim 6 wherein the first alarm event comprises an alarm speaker annunciation and the second alarm event comprises a cellular telephone system message issued to at least one predetermined remote cellular telephone system recipient.

11. The detection system as in claim 6 wherein the first alarm event comprises a vehicle signal issued to the vehicle, which vehicle signal activates a light of the vehicle or activates an alarm of the vehicle or activates a horn of the vehicle and the second alarm event comprises a cellular telephone system message issued to at least one predetermined remote cellular telephone system recipient.

12. The detection system as in claim 6 wherein the first alarm event comprises a cellular telephone system message issued to at least one predetermined remote cellular telephone system recipient, which recipient does not include an emergency center and the second alarm event comprises a second telephone system message issued to the emergency center.

13. A detection system for detecting the presence of a living being within an interior compartment of a vehicle, the detection system comprising:
a control unit adapted to be mounted within the vehicle;
a temperature sensor that senses temperatures, adapted to be mounted within the interior compartment of the vehicle, the temperature sensor communicatively coupled to the control unit;
a carbon dioxide sensor that senses carbon dioxide levels, adapted to be mounted within the interior compartment of the vehicle, the carbon dioxide sensor communicatively coupled to the control unit;
a camera having facial recognition capability, adapted to be mounted within the interior compartment of the vehicle and communicatively coupled to the control unit;
a sound sensor capable of sensing a sound, adapted to be mounted within the interior compartment of the vehicle and communicatively coupled to the control unit;
a motion detector capable of sensing motion capability, adapted mounted within the interior compartment of the vehicle and communicatively coupled to the control unit;
an alarm system communicatively coupled to the control unit, such that the alarm system is capable of triggering a first alarm event; and
wherein the temperature sensor senses the temperature within interior compartment and if the temperature crosses a first predetermined threshold temperature which is outside a safe temperature range, the carbon dioxide sensor senses the carbon dioxide level within the interior compartment of the vehicle and this carbon dioxide level is stored by the control unit as a baseline carbon dioxide level, and thereafter the carbon dioxide sensor senses at least one subsequent carbon dioxide level within the interior compartment of the vehicle and the control unit compares each of the at least one subsequent carbon dioxide levels against the baseline carbon dioxide level in order to obtain a differential, and if the differential is positive and exceeds a predetermined amount, the control unit commands the alarm system to trigger the first alarm event if the camera detects a face within the interior compartment of the vehicle via its facial recognition capability, or if the sound sensor detects a sound within the interior compartment of the vehicle and the control unit determines that the sound detected is from either a human cry or an animal, or if the motion detector detects a motion within the interior compartment of the vehicle.

14. The detection system as in claim 13 wherein the motion detector is integrated within the camera.

15. The detection system as in claim 13 wherein the motion detector is a standalone passive infrared detector.

16. The detection system as in claim 13 wherein the first alarm event comprises an alarm speaker annunciation.

17. The detection system as in claim 13 wherein the first alarm event comprises a vehicle signal issued to the vehicle, which vehicle signal activates a light of the vehicle or activates an alarm of the vehicle or activates a horn of the vehicle.

18. The detection system as in claim 13 wherein the first alarm event comprises a vehicle signal issued to the vehicle, which vehicle signal activates a window motor of the vehicle or activates an engine of the vehicle and activates an HVAC system of the vehicle.

19. The detection system as in claim 13 wherein the first alarm event comprises a cellular telephone system message issued to at least one predetermined remote cellular telephone system recipient.

20. The detection system as in claim 13 wherein after the first alarm command is issued, the temperature sensor continues to sense the temperature within interior compartment and if the temperature crosses a second predetermined threshold temperature which is outside the safe temperature range and the first predetermined threshold temperature is between the safe temperature range and the second threshold temperature, the control unit commands the alarm system to trigger at least one second alarm event.

21. The detection system as in claim 20 wherein the first alarm event comprises an alarm speaker annunciation and the second alarm event comprises a vehicle signal issued to the vehicle, which vehicle signal activates a light of the vehicle or activates an alarm of the vehicle or activates a horn of the vehicle.

22. The detection system as in claim 20 wherein the first alarm event comprises an alarm speaker annunciation and the second alarm event comprises a vehicle signal issued to the vehicle, which vehicle signal activates a window motor of the vehicle or activates an engine of the vehicle and activates an HVAC system of the vehicle.

23. The detection system as in claim 20 wherein the first alarm event comprises a first vehicle signal issued to the vehicle, which first vehicle signal activates a light of the vehicle or activates an alarm of the vehicle or activates a horn of the vehicle and the second alarm event comprises a second vehicle signal issued to the vehicle, which second vehicle signal activates a window motor of the vehicle or activates an engine of the vehicle and activates an HVAC system of the vehicle.

24. The detection system as in claim 20 wherein the first alarm event comprises an alarm speaker annunciation and the second alarm event comprises a cellular telephone system message issued to at least one predetermined remote cellular telephone system recipient.

25. The detection system as in claim 20 wherein the first alarm event comprises a vehicle signal issued to the vehicle, which vehicle signal activates a light of the vehicle or activates an alarm of the vehicle or activates a horn of the vehicle and the second alarm event comprises a cellular telephone system message issued to at least one predetermined remote cellular telephone system recipient.

26. The detection system as in claim 20 wherein the first alarm event comprises a cellular telephone system message issued to at least one predetermined remote cellular telephone system recipient, which recipient does not include an emergency center and the second alarm event comprises a second telephone system message issued to the emergency center.

27. A detection system for detecting the presence of a living being within an interior compartment of a vehicle, the detection system comprising:
a control unit adapted to be mounted within the vehicle;
a temperature sensor that senses temperatures, adapted to be mounted within the interior compartment of the vehicle, the temperature sensor communicatively coupled to the control unit;
a carbon dioxide sensor that senses carbon dioxide levels, adapted to be mounted within the interior compartment of the vehicle, the carbon dioxide sensor communicatively coupled to the control unit;
a camera having facial recognition capability, adapted to be mounted within the interior compartment of the vehicle and communicatively coupled to the control unit;
a sound sensor capable of sensing a sound, adapted to be mounted within the interior compartment of the vehicle and communicatively coupled to the control unit;
a motion detector capable of sensing motion capability, adapted to be mounted within the interior compartment of the vehicle and communicatively coupled to the control unit;
an alarm system communicatively coupled to the control unit, such that the alarm system is capable of triggering a first alarm event; and
wherein the temperature sensor senses the temperature within interior compartment and if the temperature crosses a first predetermined threshold temperature which is outside a safe temperature range, the carbon dioxide sensor senses the carbon dioxide level within the interior compartment of the vehicle and this carbon dioxide level is stored by the control unit as a baseline carbon dioxide level, and thereafter the carbon dioxide sensor senses at least one subsequent carbon dioxide level within the interior compartment of the vehicle and the control unit compares each of the at least one subsequent carbon dioxide levels against the baseline carbon dioxide level in order to obtain a differential, and if the differential is positive and exceeds a predetermined amount and a second fault event occurs, the control unit commands the alarm system to trigger the first alarm event, the second fault event occurs if the camera detects a face within the interior compartment of the vehicle via its facial recognition capability, or if the sound sensor detects a sound within the interior compartment of the vehicle and the control unit determines that the sound detected is either a human cry or a dog bark or a cat meow, or if the motion detector detects a motion within the interior compartment of the vehicle.

28. The detection system as in claim 27 wherein the motion detector is integrated within the camera.

29. The detection system as in claim 27 wherein the motion detector is a standalone passive infrared detector.

30. The detection system as in claim 27 wherein the first alarm event comprises an alarm speaker annunciation.

31. The detection system as in claim 27 wherein the first alarm event comprises a vehicle signal issued to the vehicle, which vehicle signal activates a light of the vehicle or activates an alarm of the vehicle or activates a horn of the vehicle.

32. The detection system as in claim 27 wherein the first alarm event comprises a vehicle signal issued to the vehicle, which vehicle signal activates a window motor of the vehicle or activates an engine of the vehicle and activates an HVAC system of the vehicle.

33. The detection system as in claim 27 wherein the first alarm event comprises a cellular telephone system message issued to at least one predetermined remote cellular telephone system recipient.

34. The detection system as in claim 27 wherein after the first alarm command is issued, the temperature sensor continues to sense the temperature within interior compartment and if the temperature crosses a second predetermined threshold temperature which is outside the safe temperature range and the first predetermined threshold temperature is between the safe temperature range and the second threshold temperature, the control unit commands the alarm system to issue a second command in order to activate the second alarm, the second alarm triggering at least one second alarm event.

35. The detection system as in claim 34 wherein the first alarm event comprises an alarm speaker annunciation and the second alarm event comprises a vehicle signal issued to the vehicle, which vehicle signal activates a light of the vehicle or activates an alarm of the vehicle or activates a horn of the vehicle.

36. The detection system as in claim 34 wherein the first alarm event comprises an alarm speaker annunciation and the second alarm event comprises a vehicle signal issued to the vehicle, which vehicle signal activates a window motor of the vehicle or activates an engine of the vehicle and activates an HVAC system of the vehicle.

37. The detection system as in claim 34 wherein the first alarm event comprises a first vehicle signal issued to the vehicle, which first vehicle signal activates a light of the vehicle or activates an alarm of the vehicle or activates a horn of the vehicle and the second alarm event comprises a second vehicle signal issued to the vehicle, which second vehicle signal activates a window motor of the vehicle or activates an engine of the vehicle and activates an HVAC system of the vehicle.

38. The detection system as in claim 34 wherein the first alarm event comprises an alarm speaker annunciation and the second alarm event comprises a cellular telephone system message issued to at least one predetermined remote cellular telephone system recipient.

39. The detection system as in claim 34 wherein the first alarm event comprises a vehicle signal issued to the vehicle, which vehicle signal activates a light of the vehicle or activates an alarm of the vehicle or activates a horn of the vehicle and the second alarm event comprises a cellular telephone system message issued to at least one predetermined remote cellular telephone system recipient.

40. The detection system as in claim 34 wherein the first alarm event comprises a cellular telephone system message issued to at least one predetermined remote cellular telephone system recipient, which recipient does not include an emergency center and the second alarm event comprises a second telephone system message issued to the emergency center.

* * * * *